(12) United States Patent
Manjunath et al.

(10) Patent No.: US 11,361,759 B2
(45) Date of Patent: Jun. 14, 2022

(54) METHODS AND SYSTEMS FOR AUTOMATIC GENERATION AND CONVERGENCE OF KEYWORDS AND/OR KEYPHRASES FROM A MEDIA

(71) Applicant: Streamingo Solutions Private Limited, Bangalore (IN)

(72) Inventors: Sharath Manjunath, Leeming (AU); Vidhya T V, Bangalore (IN); Vinay T S, Bangalore (IN); Chandrashekar Sirimala, Bangalore (IN)

(73) Assignee: STREAMINGO SOLUTIONS PRIVATE LIMITED, Bangalore (IN)

( * ) Notice: Subject to any disclaimer, the term of this patent is extended or adjusted under 35 U.S.C. 154(b) by 211 days.

(21) Appl. No.: 16/687,135

(22) Filed: Nov. 18, 2019

(65) Prior Publication Data

US 2021/0151038 A1 May 20, 2021

(51) Int. Cl.
| | | |
|---|---|---|
| *G10L 15/18* | (2013.01) | |
| *G10L 15/22* | (2006.01) | |
| *G06N 20/00* | (2019.01) | |
| *G10L 25/78* | (2013.01) | |
| *G06V 10/40* | (2022.01) | |
| *G10L 15/08* | (2006.01) | |
| *G06V 30/10* | (2022.01) | |

(52) U.S. Cl.
CPC .......... *G10L 15/1815* (2013.01); *G06N 20/00* (2019.01); *G06V 10/40* (2022.01); *G10L 15/22* (2013.01); *G10L 25/78* (2013.01); *G06V 30/10* (2022.01); *G10L 2015/088* (2013.01)

(58) Field of Classification Search
CPC ... G10L 15/22; G10L 25/78; G10L 2015/088; G06F 40/103; G06F 40/131; G06F 40/10; G06F 40/20; G06K 9/46; G06K 2209/01; G06N 20/00
See application file for complete search history.

(56) References Cited

U.S. PATENT DOCUMENTS

| | | | |
|---|---|---|---|
| 10,496,756 B2 * | 12/2019 | Yanai | G06F 40/30 |
| 2002/0083473 A1 * | 6/2002 | Agnihotri | H04N 21/4622 |
| | | | 725/140 |
| 2014/0129921 A1 * | 5/2014 | Bergman | G06F 40/117 |
| | | | 715/234 |

(Continued)

*Primary Examiner* — Abul K Azad
(74) *Attorney, Agent, or Firm* — Mannava & Kang, P.C.; Vinay Malik

(57) ABSTRACT

Embodiments herein disclose methods and systems for automatic generation and convergence of keywords and/or keyphrases from a media. A method disclosed herein includes analyzing at least one source of the media to obtain at least one text, wherein the at least one source includes at least one audio portion and at least one visual portion. The method further includes extracting at least one keyword of a plurality of keywords from the extracted at least one text. The method further includes generating at least one keyphrase of a plurality of keyphrases for the extracted at least one keyword. The method further includes merging at least one of the at least one keyword and the at least one keyphrase to generate a plurality of elements from the media, wherein the plurality of elements includes context dependent set of at least one of the plurality of keywords and the plurality of keyphrases.

12 Claims, 6 Drawing Sheets

(56) References Cited

U.S. PATENT DOCUMENTS

| | | | |
|---|---|---|---|
| 2016/0092407 A1* | 3/2016 | Ball | H04N 1/00 715/202 |
| 2017/0083214 A1* | 3/2017 | Furesjo | G06F 3/04845 |
| 2018/0160200 A1* | 6/2018 | Goel | H04N 21/4532 |

* cited by examiner

METHODS AND SYSTEMS FOR AUTOMATIC GENERATION AND CONVERGENCE OF KEYWORDS AND/OR KEYPHRASES FROM A MEDIA

TECHNICAL FIELD

Embodiments disclosed herein relate to electronic devices and, more particularly to identifying viewer's intent vis-à-vis the multimedia content, and facilitate productive viewing/listening of the content and incorporating said intent.

BACKGROUND

Generally, videos are being used to share information and messages on the Internet. It is now easy to make videos and capture your thought processes. It is possible to reach large audiences using video as the medium of communication. This large proliferation has resulted in there being too many videos with duplicate messages on the Internet today. There is no intelligent system, which helps to choose the right video to view and, and the one that can be understood most effectively. The user is unable to select a video, which caters to the users viewing context (what is the situation/requirement of the user) and viewing intent (what the user wants to achieve). The viewer's short attention span means that there should be a way to help the viewer to quickly get a gist of important concepts described in the video.

Existing solutions disclose methods to cater to the viewer's context by providing index of video content and providing transcripts of the speech spoken inside the video, but these methods are manual, tedious and are too limited to meet the scale of the online video content. They are clearly limited because of the technical barriers posed by the expectations of such a method, which should automatically create the viewer's context when watching a video and should meet the scale of time and be significantly less than the effort of online video content creation.

BRIEF DESCRIPTION OF THE FIGURES

The embodiments disclosed herein will be better understood from the following detailed description with reference to the drawings, in which.

DETAILED DESCRIPTION OF EMBODIMENTS

Figure 1:
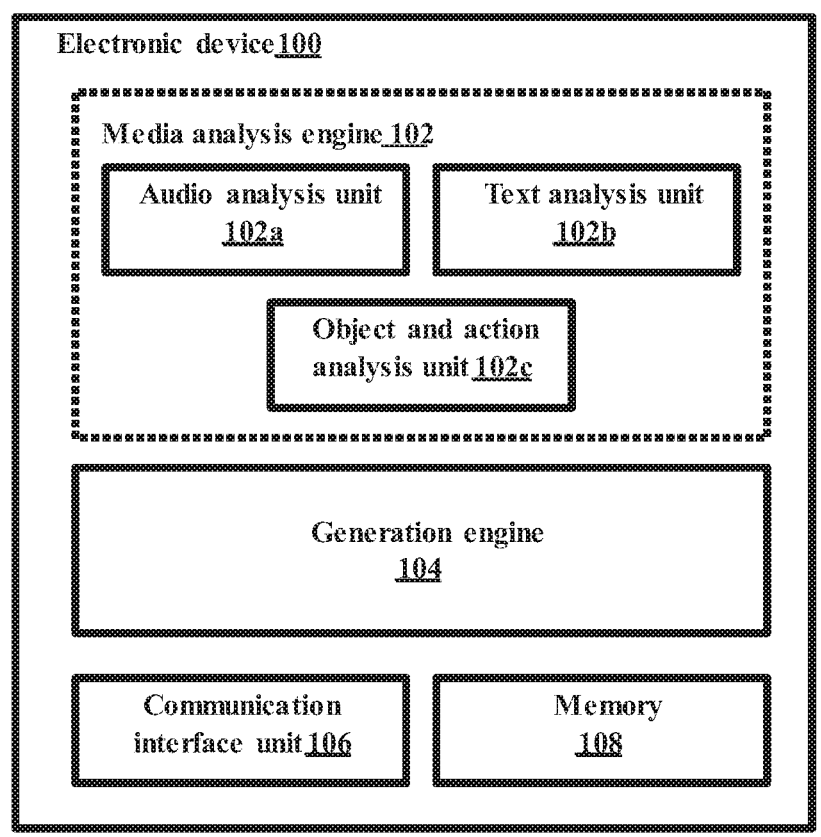
FIG. 1 is a block diagram illustrating various units of an electronic device for generating keywords/keyphrases for a media, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for automatic generation and convergence of keywords and/or keyphrases from a media using at least one of Automatic Speech Recognition (ASR), Optical Character Recognition (OCR) and Computer Vision (CV) methods.

Embodiments herein disclose methods and systems for generating a context dependent set of keywords and/or keyphrases automatically for a media, using machine learning (ML) and Natural Language Processing (NLP) methods applied to spoken audio or text recognized from the spoken audio in the media under analysis.

Embodiments herein disclose methods and systems for generating a context dependent set of keywords and/or keyphrases automatically for a media, using CV, ML and Artificial Intelligence (AI) methods applied to visual portion(s) of the media under analysis.

Embodiments herein generate a context dependent set of keywords and/or keyphrases automatically for a media, using ML and NLP methods applied to spoken audio or text recognized from the spoken audio in the media under analysis, wherein initially ASR operates on the spoken audio(audio portion) of the media to generate a transcript, from which special words/phrases are identified which capture the essence of the media.

Embodiments herein generate a context dependent set of keywords and/or keyphrases automatically for a media, using CV, ML, AI methods applied on visual portion(s) of the media under analysis, image/object detection and recognition techniques from CV and/or OCR operates on the media to detect one or more objects present in the media, which are rendered in a text format. Embodiments herein further identify special words/phrases that capture the essence of content present in the media, and the identified words/phrases are added to a set of keywords/keyphrases.

Referring now to the drawings, and more particularly to FIGS. 1 through 3d, where similar reference characters denote corresponding features consistently throughout the figures, there are shown embodiments.

FIG. 1 is a block diagram illustrating various units of an electronic device 100 for generating keywords/keyphrases for a media, according to embodiments as disclosed herein. The electronic device 100 referred herein can be a digital device which has the capability of playing content of media or accessing an application (such as a browser) which can access and display the media. Examples of the electronic device 100 can be, but is not limited to, a mobile phone, a smartphone, tablet, a phablet, a personal digital assistant (PDA), a laptop, a computer, a wearable device, a smart watch, an IoT (Internet of Things) device, a wearable computing device, a vehicle infotainment system, a medical device, a camera, a Virtual Reality (VR) device, a vehicle display and so on. Examples of the media as disclosed herein can be, but not limited to, videos, presentations, slideshows, audio, and so on. The media can include at least one of images/image frames, slides, pages and so on (depending on a type) for presenting the content. For example, the videos may include a plurality of images and the presentations may include a plurality of slides/pages to present the content.

The electronic device 100 can also communicate with external entities such as but not limited to, a server, a cloud, a database and so on using a communication network to access the media that is to be displayed to a user. Examples of the communication network can be at least one of the Internet, a wired network, a wireless network (a Wi-Fi network, a cellular network, Wi-Fi Hotspot, Bluetooth, Zigbee and so on) and so on. The electronic device 100 can also act as a server (not shown) that can generate the keywords and/or keyphrases for the media that is to be displayed on the electronic device 100/user device located in different geographical locations. The server can be at least one of a remote server, a cloud server and so on.

The electronic device 100 includes media analysis engine 102, a generation engine 104, a communication interface unit 106 and a memory 108. The electronic device 100 can also include other components such as, but not limited to, a display, Input/Output (I/O) interfaces (not shown) and so on. The media analysis engine 102 and the generation engine 104 can include at least one of a single processer, a plurality of processors, multiple homogenous cores, multiple heterogeneous cores, multiple Central Processing Unit (CPUs) of different kinds and so on.

The media analysis engine 102 can be configured to analyze at least one portion of the media and generates at least one of transcript, text and so on for generating the keywords and/or keyphrases for the media. The at least one source of the media can be at least one of audio portions (an audio domain), visual portions (a visual domain), and so on. The media analysis engine 102 includes an audio analysis unit 102a, a text analysis unit 102b and an object and action analysis unit 102c.

The audio analysis unit 102a can be configured to analyze the audio portions of the media for generating the transcript. The audio analysis unit 102a can extract audio portions from the media and separates speech portions and non-speech portions from the extracted audio portions. The audio analysis unit 102a can use standard media file analysis tools to extract the audio portions from the media. In an example herein, the audio analysis unit 102a can use "FFmpeg" tool as an example tool for extracting the audio portions, but it may be obvious to a person of ordinary skill in the art that any other media file analysis tools can be considered. In an example herein, the speech portions can be spoken audio and the non-speech portions can be text recognized from the spoken audio. In an embodiment, the audio analysis unit 102a can apply an Automatic Speech Recognition (ASR) method or the like on the extracted spoken audio to generate a transcript as an output of the ASR method. In an embodiment, the audio analysis engine 102a can apply at least one of the ML method, the NLP method or the like on the text recognized from the spoken audio to generate the transcript. In an embodiment herein, the transcript can be at least one sentence (including special words/phrases) identified from the at least one of the spoken audio and the text recognized from the spoken audio. The audio analysis unit 102a provides the transcript generated for the audio portions of the media to the generation engine 104.

The text analysis unit 102b can be configured to analyze text present in the visual portions of the media and to extract the sentences presented in the text. In an embodiment, the text analysis unit 102b extracts image frames/visual portions from the media and identifies objects, which are rendered in a text format (the text present in the image frames). The text analysis unit 102b can use standard media file analysis tools to extract the visual portions from the media, decode frames in the extracted visual portions and to store the frames as the image frames. In an example herein, the audio analysis unit 102a can use "FFmpeg" tool as an example tool for extracting the image frames from the visual portions of the media, but it may be obvious to a person of ordinary skill in the art that any other media file analysis tools can be considered. The text can include at least one of fully formed sentences/full sentences, descriptive lines presented graphically, short phrases, standalone words and so on. In an embodiment, the text analysis unit 102b applies an Optical Character Recognition (OCR) method on the text present in the image frames to determine if the text contains the full sentences. On determining that the text contains the full sentences, the text analysis unit 102b extracts nouns and adjectives from the full sentences. The text analysis unit 102b further provides the sentences identified with the nouns and the adjectives to the generation engine 104. On detecting that the text does not contain any full sentences, the text analysis unit 102b forms a set of sentences. In an embodiment, the text analysis unit 102b forms the set of sentences from at least one of the slides, the pages, the images and so on of the media. In an embodiment, the text analysis unit 102b forms the set of sentences from each chapter of the media. In an embodiment, the text analysis unit 102b forms the set of sentences from an entire media. The text analysis unit 102b provides the formed set of sentences to the generation engine 104.

The object and action analysis unit 102c can be configured to analyze objects and actions present in the media for determining text for the objects and the actions present in the media. In an embodiment, the object and analysis unit 102c extracts the images frames of the media and applies methods such as, but not limited to, a Computer Vision (CV) method, a ML method, Artificial Intelligence (AI) method and or the like on the extracted image frames to detect the objects and actions present in the image frames. Examples of the objects can be, but not limited to, people, animals, non-living things and so on. Examples of the actions can be, but not limited to, actions performed by the people (example driving a car, operating a machine and so on), actions performed by the animals, functions/working of the non-living things and so on. In an embodiment, the object and analysis unit 102c analyses the objects and the actions and assigns the keywords for the objects and the actions. The keywords assigned for the objects and the actions can be at least one of special words, standalone words, descriptive words or the like. The keywords assigned for the objects and actions indicate at least one of a class, a name, a description and so on of the objects and actions. The object and actions analysis unit 102c provides the keywords assigned for the objects and the actions to the generation engine 104.

In an embodiment, the object and action analysis unit 102c analyses the objects and the actions and generates textual descriptor for the actions and the objects. The textual descriptor provided for the objects and the actions can be at least one of short phrases, descriptive lines, special phrases or the like describing the actions and the objects. In an embodiment, the object and analysis unit 102c analyses the objects and the actions and generates a scene analysis text for the objects and the actions. In an embodiment, the object and action analysis unit 102c analyses the objects and the actions and generates an event analysis text for the objects and the actions. The object and action analysis unit 102c can use suitable methods (such as YOLO (You Only Look Once) method or the like) to generate the textual descriptor, the scene analysis text and the event analysis text. The object and action analysis unit 102c further provides at least one of the textual descriptor, the scene analysis text, the event analysis text and so on generated for the objects and actions present to the generation engine 104.

The generation engine 104 can be configured to receive inputs (rendered in a form of the text) from at least one of the audio analysis unit 102a, the text analysis unit 102b and the object and action analysis unit 102c of the media analysis engine 102 and generates the keywords and/or keyphrases for the media. The inputs referred herein can be at least one of the transcript, the full sentences, the set of sentences, the keywords assigned for the objects and the actions, the textual descriptor, the scene analysis text, the event analysis text and so on, which can be collectively referred as text hereinafter. The generation engine 104 can analyze the received text identically, irrespective of the source of the text.

In an embodiment, the generation engine 104 processes the received text and extracts the keywords from the text. The generation engine 104 extracts the keywords from the text using methods such as, but not limited to, a graph algorithm method or the like. In an example herein, the generation engine 104 uses a graph algorithm method such as Text-Rank as an example method for extracting the keywords from the text, but it may be obvious to a person of ordinary skill in the art that any other graph algorithm methods can be considered. The keywords referred herein can be special words, which capture essence of the sentences present in the text. The generation engine 104 can consider the text individually (as words), in groups (such as a sentence, a phrase, and so on), or as sets (such as two or more sentences, two or more phrases, and so on) and compiles the text to extract the words as the keywords, which capture essence of the sentences of the text.

In an embodiment, the generation engine 104 generates the keyphrases/nested keyphrases for the identified keywords. The keyphrases can be referred to at least one of small sentences, short phrases, and so on. The generation engine 104 generates the keyphrases by connecting a single keyword (of the identified keywords) with proximity words belonging to suitable parts of speech (grammatically), whether they occur next to each other or in reasonable proximity. The proximity words can be words which occur in an immediate vicinity before or after the keywords which further qualify the keywords in the manner of nouns, adjective and adverbs, that can be used for generating the keyphrases (For example: "principle"→"fundamental principle", "algorithm"→"artificial intelligence algorithm"). In an embodiment herein, for determining the words to be connected to the keyword, the generation engine 104 can apply rules such as—words preceding and succeeding the keyword may have the following pattern (Adverb) (Adjective) (Noun[Singular]) (Keyword) (Noun[Singular/Plural]), wherein none or more of any of the respective words can be present; —stop words may not be included, and so on.

In an example, consider that a word 'sales' is the keyword. The generation engine 104 can determine a context around the word 'sales'. For example, in some sentences/phrases of the received text, a word 'primary' precedes the word 'sales'. Accordingly, the generation engine 104 can create a nested keyphrase as 'primary sales' for the keyword 'sales'.

In an example, consider that a word 'media' is the keyword. The generation engine 104 can determine a context around the word 'media'. For example, in some sentences/phrases of the received text with the term 'media', a word 'social precedes the word 'media' and the word 'marketing' succeeds the word 'media'. Accordingly, the generation engine 104 can create a nested keyphrase as 'social media marketing'.

Once the keyphrases for the keywords are generated, the generation engine 104 merges the identified keywords and/or keyphrases using a simple side-by-side existence. For merging the keywords and/or keyphrases, the generation engine 104 forms a list of keywords and keyphrases based on the methods/source methods(for example, the ASR method, the OCR method and so on and hereinafter referred as source methods) used for obtaining text from the source of the media from which the keywords and/or keyphrases are extracted. For example, the generation engine 104 forms a first list of keywords and keyphrases, wherein the keywords and/or keyphrases included in the first list are extracted from the transcript/text that is obtained by applying the ASR method on the audio portions of the media. The generation engine 104 forms a second list of keywords and keyphrases, wherein the keywords and/or keyphrases of the second list are extracted from the full sentences/text obtained by applying the OCR method on the image frames (the visual portions) of the media. The generation engine 104 forms a third list of keywords and keyphrases, wherein the keywords and/or keyphrases of the third list are extracted from the at least one of the textual descriptor, the scene analysis text, the event analysis text (related to the objects and/or the actions) or the like obtained by applying the CV method on the image frames (the visual portions) of the media. Thus, the list of keywords and keyphrases may be formed based on the source methods associated with the keywords and/or keyphrases. In an embodiment, a number of list of keywords and keyphrases depends on a number of sources available from the media and the source methods used to extract text from the number of sources. For example, consider that a video (media) has image frames containing text, image frames containing objects and actions and audio portions containing spoken audio, wherein the OCR method is used to extract the text from the image frames containing the text, the CV method is used to extract the text from the image frames of the video containing the objects and the actions and the ASR method is used to extract the text from the spoken audio. Then, the number of list of keywords and keyphrases formed by the generation engine 104 for the video is three.

In an embodiment, the generation engine 104 assigns rank for the keywords/keyphrases present in each list of along with timestamps. The generation engine 104 can assign the rank for the keywords/keyphrases using methods such as, but not limited to, a graph algorithm method or the like. In an example herein, the generation engine 104 uses a graph algorithm method such as Text-Rank as an example method for assigning the rank to the keywords/keyphrases, but it may be obvious to a person of ordinary skill in the art that any other graph algorithm methods can be considered. The timestamps indicate time of occurrence of the keywords and/or keyphrases in the media. Further, the generation engine 104 annotates each list of keywords and keyphrases with the source methods (method applied on the source of the media to obtain the text from which the corresponding keywords and/or keyphrases present in each list is extracted) associated with the present in each list. Consider an example scenario, wherein a first list of keywords and keyphrases includes the extracted from the text/transcript relevant to the audio portions of the media. In such scenario, the generation engine 104 annotates the first list with the ASR method, since the ASR method is used to extract the text/transcript relevant to the audio portions of the media. Consider another example scenario, wherein a second list of keywords and keyphrases includes the keywords and/or keyphrases extracted from the text/full sentences relevant to the image portions of the media. In such scenario, the generation engine 104 annotates the second list with the OCR method, since the OCR method is used to extract the text/full sentences relevant to the image portions of the media. Consider another example scenario, wherein a third list of keywords and keyphrases includes the keywords and/or keyphrases extracted from the text relevant to the image portions of the media containing the objects and/or actions. In such scenario, the generation engine 104 annotates the third list with the CV method, since the CV method is used to extract the text/full sentences relevant to the image portions containing the objects and/or actions. The generation engine 104 stores the annotated list of keywords and keyphrases independently in the memory 108. In an embodiment, the generation engine 104 uses at least one criterion to raise or lower rank of each list of the keywords and/or keyphrases. The at least one criterion can be quality of the audio portions, the visual portions and so on from which the keywords and/or keyphrases are generated. The quality of the audio portions, the visual portions and so on can be assessed using quality assessment methods such as, but not limited to, Perceptual Evaluation of Speech Quality (PESQ) method or the like. The quality of the audio portion can be further assessed based on a performance of the ASR method via an average confidence score (which can be determined by the media analysis engine 102) associated with the keywords and/or keyphrases present in each list. In an example herein, consider that the keyword in the list is extracted from the audio portion of a poor quality. In such a case, the keyword may likely have low confidence score from the ASR and can be ranked below the keyword and/or keyphrase that may be extracted from the audio portion of good quality which may likely have higher confidence score from the ASR or the keyword and/or keyphrase that may be extracted from the video portion/image frame of good quality which may likely have higher confidence score from the object or action detection method, though there might be other reasons (good and well-trained methods or the CV method or the ASR method) for higher or lower confidence score.

Further, the generation engine 104 weighs rank of each list of keywords and keyphrases based on the confidence score (which can be determined by the media analysis engine 102) associated with the keywords and/or keyphrases present in each list. The confidence score associated with the keywords and/or keyphrases can be determined based on reported score of the ASR method, confidence score reported by the CV method while recognizing the object/character, confidence score reported by the CV method while recognizing the word and so on. After weighing the ranks of the list of keywords and/or keyphrases annotated with the source methods, the generation engine 104 generates an intersection set and a union set. In an embodiment, the generation engine 104 determines common keywords and/or keyphrases present across the list of keywords/keyphrases (annotated with the source methods) to generate the intersection set. Thus, the intersection set includes common keywords and/or keyphrases present across the list of keywords/keyphrases. The generation engine 104 stores the intersection set in the memory 108. In an embodiment, after generating the intersection set, the generation engine 104 generates a union set. The generating engine 104 generates the union set by combining remaining keywords and/or keyphrases (uncommon words) present across the list of keywords and/or the keyphrases (annotated with the source methods). The generating engine 104 removes duplicate keywords and/or the keyphrases in the union set.

Further, the generation engine 104 adjusts the timestamps of the keywords and/or keyphrases present in the intersection set. In an embodiment, the generation engine 104 adjusts the timestamps of the keywords and/or keyphrases based on the source methods associated with the keywords and/or keyphrases. The generation engine 104 compares a modular difference between the timestamps of the same keywords and/or keyphrases associated with different source methods with a threshold duration as shown in below equation:

$$|TS(method_i) - TS(method_j)| < n$$

wherein, 'n' represents the threshold duration (n secs), '$TS(method_i)$' represents the timestamp of the keyword and/or keyphrase extracted from the at least one source (the visual portions) of the media using a method, (for example the OCR method) and '$TS(method_j)$' represents the timestamp of the same keyword and/or keyphrase extracted from the at least one source (the audio portions) of the media using a $method_j$ (for example the ASR method). Further, the threshold duration can be a sensible threshold duration that can be set empirically based on observational average over a large set of data and/or based on subjective feedback received from the users.

If the modular difference between the timestamps of the keywords and/or keyphrases extracted from the different source methods is not within the threshold duration, then the generation engine 104 sets the timestamp of the keywords and/or keyphrases by selecting the timestamp of the keywords and/or keyphrases which have the higher confidence score as shown in the below equation:

$$TS = TS(method_1), \max_i \text{ confidence score}(method_1)$$

In an embodiment, if the modular difference between the timestamps of the keywords and/or keyphrases extracted from the different source methods is within the threshold duration, then the generation engine 104 sets the timestamp of the keywords and/or keyphrases by selecting lower timestamp of the keywords and/or keyphrases as shown in the below equation:

$$TS = \min_i TS(method_i) \text{(Earlier occurrence preferred)}$$

In an embodiment, if the modular difference between the timestamps of the keywords and/or keyphrases extracted from the different source methods is within the threshold duration, then the generation engine 104 sets the timestamp of the keywords and/or keyphrases by selecting higher timestamp of the keywords and/or keyphrases as shown in the below equation:

$$TS = \max_i TS(method_i) \text{(Earlier occurrence preferred)}$$

In an embodiment, the generation engine 104 adjusts the timestamps of the keywords and/or keyphrases of the intersection set to rank the intersection set higher than the union set (since, the keywords and/or keyphrases present in the intersection set is extracted from the one or more portions of the media using the one or more source methods).

Once the intersection set, the union set is formed, and the intersection set is ranked, the generation engine 104 combines the union set and the intersection set to generate the context dependent keywords and/or keyphrases for the media. In an embodiment, the generation engine 104 combines the union set and the intersection by preserving the ranking within the intersection set, but placed higher than the union set. The generation engine 104 also modifies the ranking of the keywords and/or keyphrases in the intersection set to ensure that the lowest ranked keyword and/or keyphrase present in the intersection set is placed higher than the highest ranked keyword and/or keyphrase present in the union set. The generation engine 104 can modify the ranking of the keywords and/or keyphrases in the intersection set based on the confidence score associated with the keywords and/or keyphrases. The generation engine 104 further removes the duplicate keywords across both sets, if any, while preserving all timestamps to reliably list the frequency and position of all occurrences of the keywords and/or keyphrases in the media. Thus, generating the context dependent set of keywords and/or keyphrases provides relevance to the content of the media under consideration by satisfying the user/viewer intent.

The communication interface unit 106 can be configured to establish communication between the electronic device 100 and the at least one external entity, using the communication network.

The memory 108 can be configured to store media, textual summary, the union set and the intersection set, the keywords, and keyphrases generated from the respective media, and so on. The memory 108 may include one or more computer-readable storage media. The memory 108 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 108 may, in some examples, be considered a non-transitory storage medium. The term "non-transitory" may indicate that the storage medium is not embodied in a carrier wave or a propagated signal. However, the term "non-transitory" should not be interpreted to mean that the memory 108 is non-movable. In some examples, the memory 108 can be configured to store larger amounts of information than the memory. In certain examples, a non-transitory storage medium may store data that can, over time, change (e.g., in Random Access Memory (RAM) or cache).

FIG. 1 shows exemplary units of the electronic device 100, but it is to be understood that other embodiments are not limited thereon. In other embodiments, the electronic device 100 may include less or more number of units. Further, the labels or names of the units are used only for illustrative purpose and does not limit the scope of the embodiments herein. One or more units can be combined together to perform same or substantially similar function in the electronic device 100.

Figure 2:
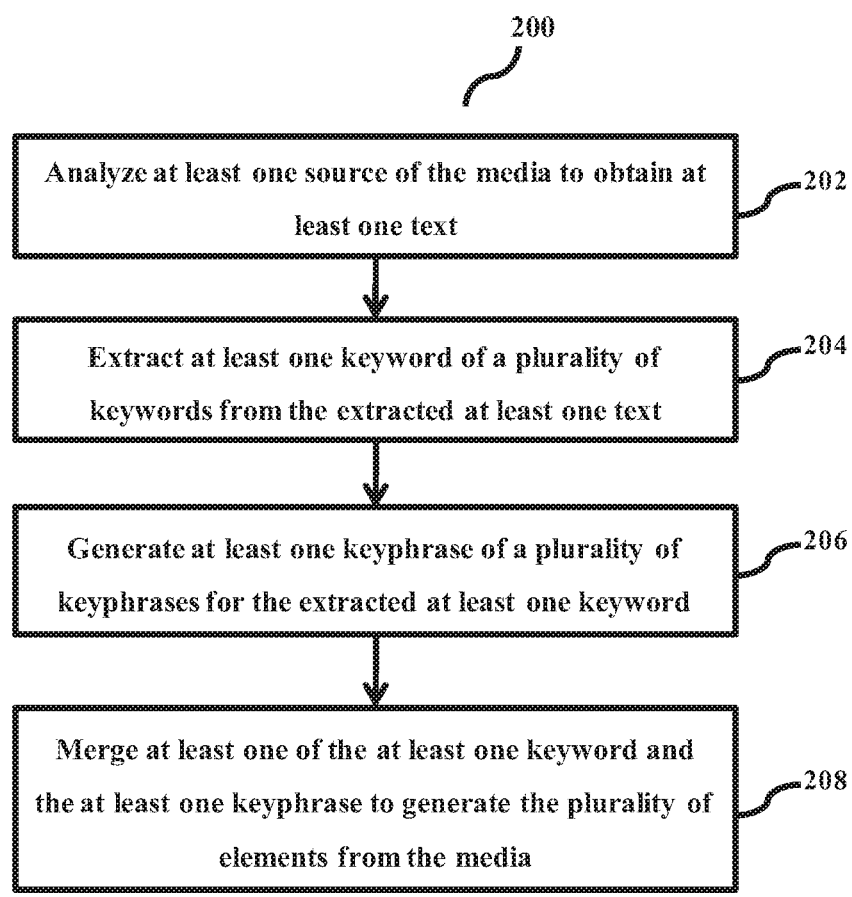
FIG. 2 is a flow diagram illustrating a method for generating keywords and/or keyphrases for a media, according to embodiments as disclosed herein.

FIG. 2 is a flow diagram 200 illustrating a method for generating the keywords and/or keyphrases from the media, according to embodiments as disclosed herein.

At step 202, the method includes analyzing, by the electronic device 100, the at least one source of the media to obtain the text. The text can be referred to at least one of the transcript obtained from the audio portion(s) of the media, the fully formed sentences and the set of sentences obtained by the visual portion(s) of the media, the keywords, the textual descriptor, the scene analysis text and the event analysis text or the like obtained from the visual portion(s) of the media. The electronic device 100 extracts the audio portion(s) from the media under analysis. In an embodiment, the electronic device 100 applies the ASR method or the like on the audio portion(s) of the media and obtains the transcript from the audio portion(s) of the media. The electronic device 100 extracts the visual portion(s)/image frames of the media. The image frames includes at least one of the text portions and the objects and the actions. In an embodiment, the electronic device 100 applies the OCR method on the text portions of the image portions. The electronic device 100 determines whether the text portions include fully formed sentences or not by processing an output of the OCR method. On determining that the text portions include fully formed sentences, then the electronic device 100 identifies the nouns and adjectives present in the fully formed sentences. Otherwise, the electronic device 100 forms the set of sentences from the at least one of the page, the slide, the image, the chapter of the media and the entire media. In an embodiment, the electronic device 100 applies the CV method on the image frames to detect the objects and the actions present in the image frames. The electronic device 100 further processes the detected objects and actions to generate at least one of the keywords, the textual descriptor, the scene analysis text, the event analysis text and so on.

At step 204, the method includes extracting, by the electronic device 100, the keywords from the extracted text. At step 206, the method includes generating, by the electronic device 100, the keyphrases for the extracted keywords. The electronic device 100 determines other keywords that are in proximity (preceding/succeeding) with the extracted keywords in the corresponding text obtained from the at least one source of the media. The electronic device 100 connects/associates the other keywords with the extracted keywords to generate the keyphrases for the keywords.

At step 208, the method includes merging, by the electronic device 100, the keywords and/or keyphrases to generate the plurality of elements from the media. The plurality of elements includes context dependent set of keywords and/or keyphrases. The electronic device 100 forms the lists of keywords and keyphrases based on the source methods (for example, the ASR method, the OCR method and so on) associated with the keywords and/or keyphrases. Further, the electronic device 100 ranks the keywords and/or keyphrases present in each list along with the timestamps and annotates each list with the source method. The electronic device 100 further forms the union set and the intersection by selecting the at least one list of keywords and keyphrases. The electronic device 100 may select the at least one list of keywords and keyphrases based on the source methods used for the extraction of the keywords and/or keyphrases that are present in the at least one list. For example herein, consider that two lists are formed. Further a first list may comprise of keywords that are extracted from the audio portions of the media using the ASR method and a second list may comprise of keywords that are extracted from the image frames (including the text) of the media using the OCR method). In such a case, the electronic device 100 may select the second list (by prioritizing the image over the speech) as a final set without a need for forming the union set and the intersection set. The electronic device 100 may also select the first list (by prioritizing the speech over the image) as the final set without a need for forming the union set and the intersection set. The electronic device 100 may also select and combine the first and second lists as the final set without a need for forming the union set and the intersection set. If there is only list with only one source method, the electronic device 100 may select that list as the final set for forming the union set and the intersection set. The electronic device 100 may also form the union set and the intersection using all the formed lists (without any selection).

The electronic device 100 ranks the intersection set higher than the union set by adjusting the timestamps of the keywords and/or keyphrases present in the intersection set. The electronic device 100 further combines the union set and the intersection set to generate the context dependent set of keywords and/or keyphrases for the media.

The various actions, acts, blocks, steps, or the like in the method and the flow diagram 200 may be performed in the order presented, in a different order or simultaneously. Further, in some embodiments, some of the actions, acts, blocks, steps, or the like may be omitted, added, modified, skipped, or the like without departing from the scope of the invention.

Figure 3A:
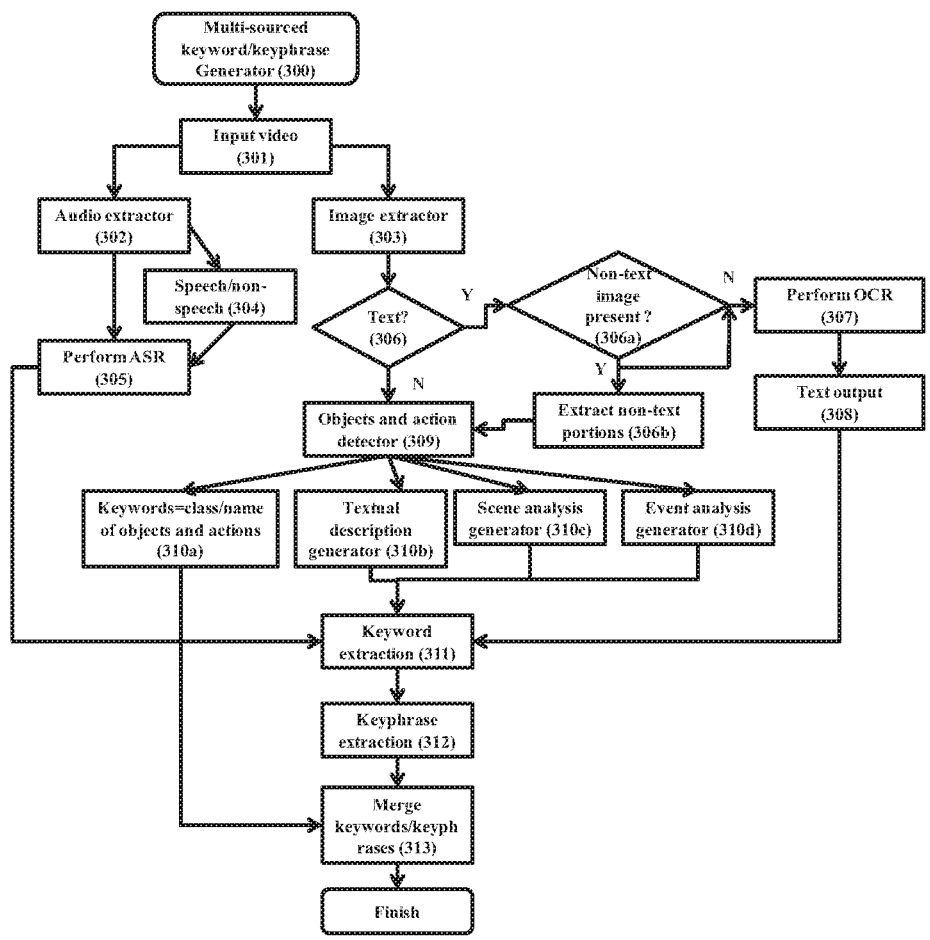
FIG. 3a is an example flow diagram illustrating a method for extracting keywords and/or keyphrases from at least one source of a media, according to embodiments as disclosed herein.

FIG. 3*a* is an example flow diagram 300 illustrating a method for extracting the keywords and/or keyphrases from the at least one source of the media, according to embodiments as disclosed herein. The electronic device 100 obtains (at step 301) the media from at least one of the memory 106 and the at least one external entity in order to be displayed to the user. Embodiments herein are further explained considering a video as the media, but it may be obvious to a person of ordinary skill in the art that any other type of media such as, but not limited to, presentations, slideshows and so on can be considered. On obtaining the video to be displayed to the user, the electronic device 100 extracts (at step 302) the audio portion(s) of the video and extracts (at step 303) the visual portion(s) (the image frames) of the video in parallel. The electronic device 100 processes the audio portions and the visual portions of the video to extract the keywords and/or keyphrases.

On extracting the audio portion(s) of the video, the electronic device 100 separates (at step 304) the speech portions/spoken audio and the non-speech portions from the extracted audio portions. The electronic device 100 further applies (at step 305) the ASR method on the spoken audio to generate the transcript, which can be rendered in the text format. The transcript can include at least one sentence.

On extracting the image frames of the media, the electronic device 100 checks (at step 306 and at step 306*a*) whether the image frames include the text and non-text image (the non-text portions). On determining that the image frames include the non-text image (the non-text portions), the electronic device 100 applies (at step 307) the OCR method on the image frames and extracts (at step 308 and further illustrated in FIG. 3*b*) at least one of the full sentences identified with the nouns and the adjectives, the set of sentences and so on. On determining that the image frames do not include the non-image text, the electronic device 100 further extracts (at step 306*b*) the non-text portions from the image frames. On extracting the non-text portions from the image frames and determining that the image frames do not include the text, the electronic device 100 applies (at step 309) the CV method on the image frames to extract the objects and the actions preset in the image frames. The electronic device 100 analyzes (at step 310) the extracted objects and actions and generates (310*a*-310*d*) at least one of the keywords indicating the class/name of the objects and the actions, the textual descriptor, the scene analysis text, the event analysis text and so on.

The electronic device 100 processes (at step 311) the text extracted from the analysis of the audio portions and the visual portions of the video and extracts the keywords from the text. The text herein can be at least one of the transcript, the full sentences, the set of sentences, the textual descriptor, the scene analysis text, the event analysis text and so on. After extracting the keywords from the text, the electronic device 100 generates (at step 312) the keyphrases for the extracted keywords using suitable methods or as a byproduct of the ASR. Further, the electronic device 100 can modify or update the keyphrases in order to improve quality ad relevance of the generated keyphrases. The electronic device 100 merges (at step 313 and further illustrated in detail in FIG. 3*c*) the keywords and/or keyphrases obtained from the multiple sources of the video to generate the context dependent set of the keywords and/or keyphrases for the video.

Figure 3B:
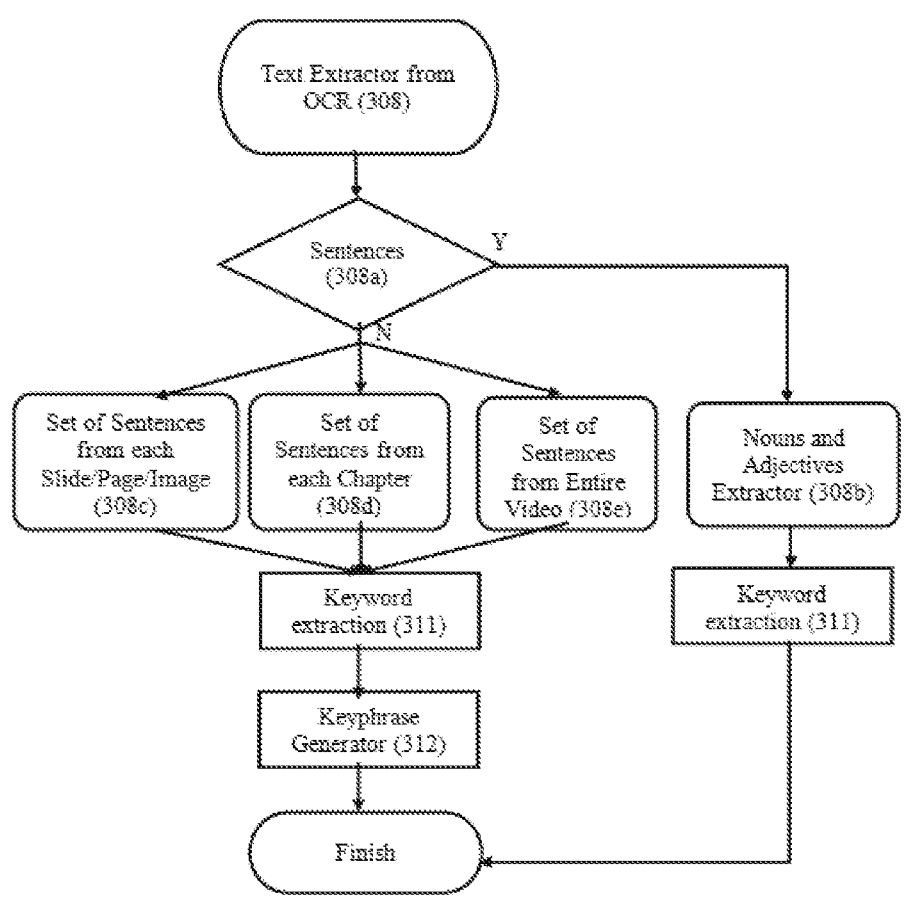
FIG. 3b is an example flow diagram illustrating a method for extracting keywords and/or keyphrases from visual portions of a media, according to embodiments as disclosed herein.

FIG. 3*b* is an example flow diagram 308 illustrating a method for extracting the text from the visual portions of the media containing the text, according to embodiments as disclosed herein. On extracting the image frames of the video/media containing the text, the electronic device 100 applies the OCR on the text and determines (at step 308*a*) if the text contains the full sentences. If the text contains the full sentences, the electronic device 100 then extracts (at step 308*b*), the nouns and the adjectives present in the full sentences. The electronic device 100 processes (at step 311) the full sentences with the identified nouns and the adjectives to extract the keywords and generates (at step 312) the keyphrases for the extracted keywords.

In an embodiment, if the text does not contain the full sentences, the electronic device 100 forms (at step 308*c*) the set of sentences from each image of the video. The electronic device 100 also forms (at step 308*d*) the set of sentences from each chapter of the video. The electronic device 100 also forms (at step 308*e*) the set of sentences from the entire video. The electronic device 100 processes (at step 311) formed full set of sentences to extract the keywords and generates (at step 312) the keyphrases for the extracted keywords.

Figure 3C:
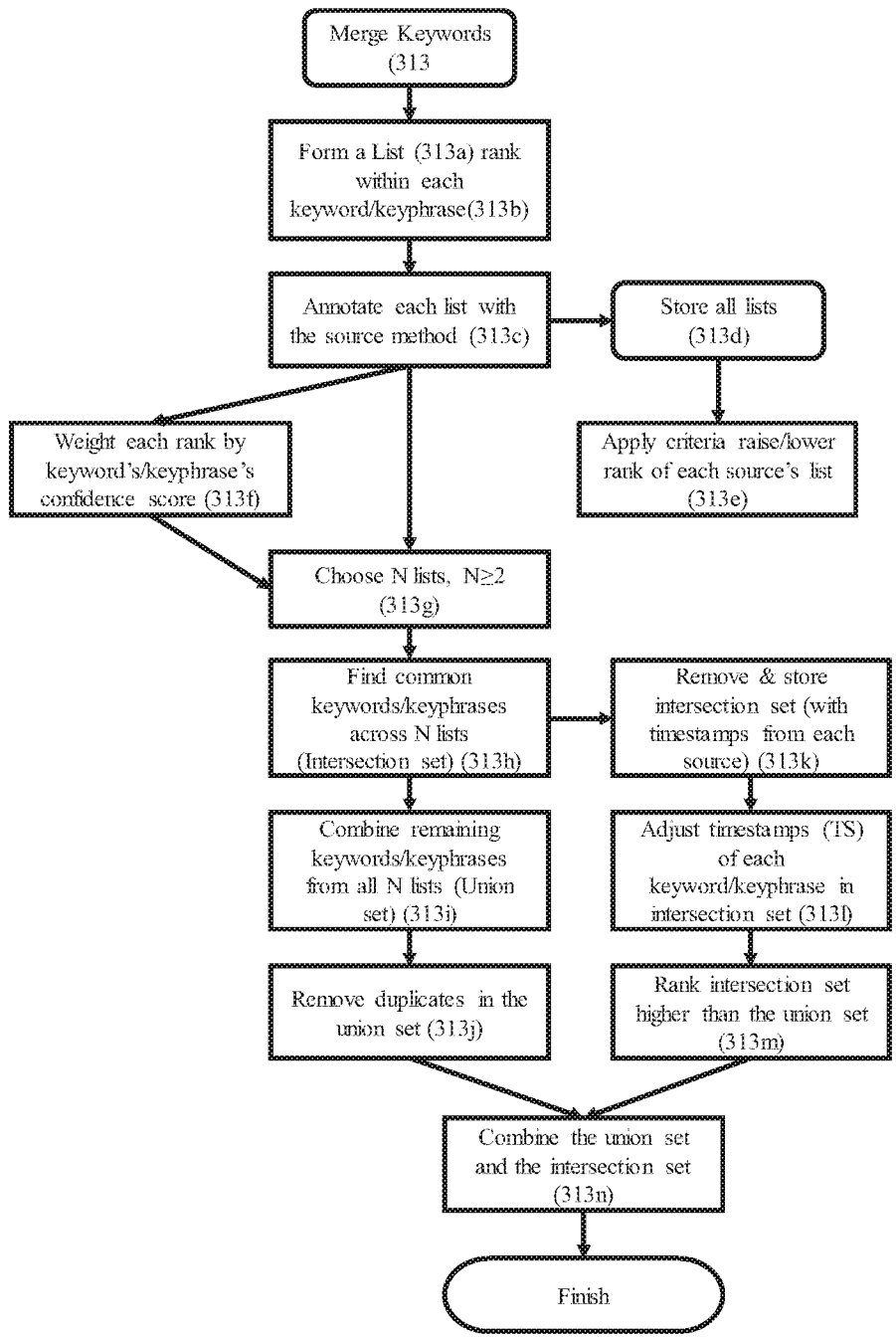
FIG. 3c is an example flow diagram illustrating a method for merging multi-sourced keywords and/or keyphrases to generate a context dependent set of keywords and/or keyphrases for a media, according to the embodiments as disclosed herein.

FIG. 3*c* is an example flow diagram 313 illustrating a method for merging the multi-sourced keywords and/or keyphrases to generate the context dependent set of keywords and/or keyphrases for the media, according to the embodiments as disclosed herein. The electronic device 100 forms (at step 313*a*) the list of keywords and keyphrases based on the source methods (for example: the ASR method, the OCR method, the CV method and so on) associated with the keywords and/or keyphrases on extracting the multi-sourced keywords and/or keyphrases. The number of lists can be varied based on the source methods used to analyze the media for extracting the keywords and/or keyphrases. In an example herein, consider that the video has image frames containing text, image frames containing objects and actions, audio portions containing spoken audio. Further, the electronic device 100 uses the OCR method, the CV method and the ASR method to analyze the video. Thus, three lists of keywords and keyphrases can be formed for the video (for example; an OCR based list of keywords and keyphrases, an ASR based list of keywords and keyphrases and a CV based list of keywords and keyphrases).

The electronic device 100 assigns (at step 313*b*) the rank to each keyword and/or the keyphrase present in each list. The electronic device 100 further annotates (at step 313*c*) each list with the source method (for example: the ASR method, the OCR method, the CV method and so on) associated with the keywords and/or keyphrases present in each list. The electronic device 100 stores (at step 313*d*) the list of keywords and keyphrases annotated with the source methods in the memory 108. The electronic device 100 applies (at step 313*e*) at least one criterion to raise/lower the rank of the keywords and/or keyphrases present in each list annotated with the source methods.

The electronic device 100 further weighs (at step 313*f*) the rank of the keywords and/or keyphrases present in each list annotated with the source methods. The electronic device 100 further chooses (at step 313g) at least one list from the multiple lists (N lists) of keywords and/or keyphrases. In an example herein, consider that the electronic device 100 chooses the OCR based list of keywords and keyphrases and the ASR based list of keywords and keyphrases. The electronic device 100 finds (at step 313h) the common keywords and/or keyphrases present in the chosen lists (for example; the OCR based list and the ASR based list) to form the intersection set. In an example herein, the electronic device 100 forms the intersection set by removing the duplicate keywords and/or keyphrases from the OCR based list of keywords and keyphrases and the ASR based list of keywords and keyphrases. The electronic device 100 orders the OCR based keywords and/or keyphrases and the ASR based keywords/or keyphrases in the intersection set based on the rank and the timestamps of the OCR based keywords and/or keyphrases and the ASR based keywords/or keyphrases.

The electronic device 100 finds (at step 313i) the remaining (uncommon) keywords and/or keyphrases from the chosen lists (for example; the OCR based list and the ASR based list) to form the union set. The electronic device 100 further removes (at step 313j) the duplicate keywords and/or keyphrases from the union set. In an example herein, the electronic device 100 forms the union set by ordering the OCR based keywords and/or keyphrases and the ASR based keywords/or keyphrases by the unmodified rank. For ordering the union set, the electronic device 100 optionally multiplies the rank of the OCR based keywords and/or keyphrases and the ASR based keywords/or keyphrases by the associated confidence score (which can be obtained as a byproduct of the OCR method/the ASR method and the confidence score indicates the probability that the word/phrase is indeed what was spoken or indeed the descriptor of the class of object detected). Thus, multiplying the rank of the keywords and/or keyphrases by the associated confidence score results in a more accurate representation of the ordering of the keywords and/or keyphrases.

The electronic device 100 also removes and stores (at step 313k) the intersection set with the timestamps from each source of the media in the memory 108. The electronic device 100 adjusts (at step 313k and further illustrated in detail in FIG. 3d) the timestamps of the keywords and/or keyphrases present in the intersection set(for example: the OCR based keywords and/or keyphrases and the ASR based keywords/or keyphrases). The electronic device 100 ranks (at step 313m) the intersection set higher than the union set.

The electronic device 100 combines (at step 313n) the union set and the intersection set to generate the context dependent set of keywords and/or keyphrases for the video. The electronic device 100 combines the union set and the intersection set by performing at least one action. The at least one action can be at least one of preserving the ranking of the keywords and/or keyphrases in the intersection list, but placed higher than the union set, modifying the ranking of the keywords and/or keyphrases in the intersection list, removing the duplicate keywords and/or keyphrases across both the sets and so on.

Figure 3D:
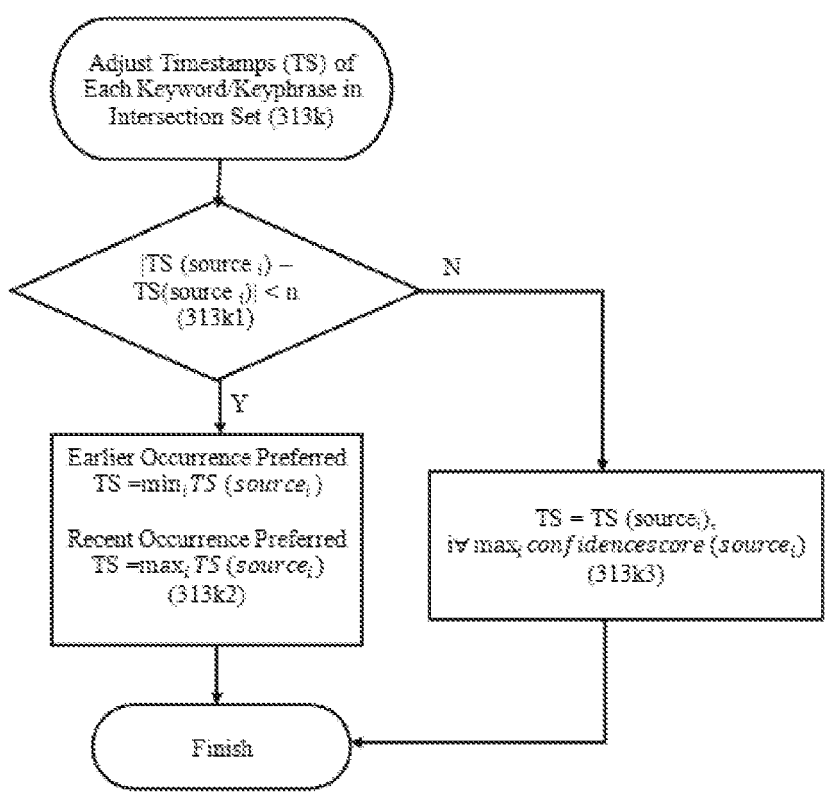
FIG. 3d is an example flow diagram illustrating a method for adjusting timestamps of keywords and/or keyphrases present in an intersection set, according to embodiments as disclosed herein.

FIG. 3d is an example flow diagram 313k illustrating a method for adjusting the timestamps of the keywords and/or keyphrases present in the intersection set, according to embodiments as disclosed herein. The electronic device 100 adjusts the timestamps of keywords and/or keyphrases present in the intersection set based on the source methods associated with the keywords and/or keyphrases. In an example herein, consider that the intersection set includes the keyword that is commonly found in the OCR based list (the OCR based keyword) and the ASR based list (the ASR based keyword). The electronic device 100 checks (at step 313k1) if the timestamps of the OCR based keyword (TS (source method$_i$)) is within the threshold duration (n secs) of the ASR based keyword (TS (source method$_j$)). If the timestamps of the OCR based keyword is within the threshold duration of the ASR based keyword, the electronic device 100 sets (at step 313k2) the timestamp of the commonly found keyword to a lower timestamp of the OCR based keyword (if designed to access earlier occurrence in the image frame and the spoken audio). Alternatively, the electronic device 100 sets (at step 313k2) the timestamp of the commonly found keyword to a higher timestamp of the OCR based keyword (if designed to access earlier more recent occurrence in the image frame and the spoken audio).

If the timestamps of the OCR based keyword is not within the threshold duration of the ASR based keyword, the electronic device 100 sets the timestamp of the commonly found keyword by selecting the timestamp of the keyword having the higher confidence score. In an example herein, the electronic device 100 considers the timestamp of the OCR based keyword since the OCR based keyword has the higher confidence score.

Embodiments herein automatically generate a context dependent of keywords and/or keyphrases for a media by applying methods such as, but not limited to, an Automatic Speech Recognition (ASR) method, an Optical Character Recognition (OCR) method, a Computer Vision (CV) method or the like on at least one source of the media. The extracted keywords and/or keyphrases provide relevance to content present in the media by satisfying user intent. Further, the extracted keywords and/or keyphrases matching content can be linked or inserted inside the media.

Embodiments herein use the extracted keywords and/or keyphrases to generate at least one of titles, summaries (textual summaries, video summaries and so on), questions and so on for the media.

Embodiments herein use the extracted keywords and/or keyphrases as search parameters in order to get relevant content from the media.

Embodiments herein use the extracted keywords and/or keyphrases for analyzing the media content. Analyzing the media content includes analyzing frequencies of occurrence of the keywords and/or keyphrases in image frames, spoken audio and visually represented objects and actions, analyzing a mutual reconciliation between the image frames, the spoken audio and the visually represented objects, actions, performing comparison among the image frames, the spoken audio and the visually represented objects, and actions and so on.

The embodiments disclosed herein can be implemented through at least one software program running on at least one hardware device and performing network management functions to control the elements. The elements shown in FIG. 1 can be at least one of a hardware device, or a combination of hardware device and software module.

The embodiments disclosed herein describe methods and systems for generating a context dependent set of keywords and/or keyphrases for a media. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method for generating a plurality of elements from a media, the method comprising:
    analyzing, by an electronic device, at least one source of the media to obtain at least one text, wherein the at least one source includes at least one of at least one audio portion and at least one visual portion;
    extracting, by the electronic device, at least one keyword of a plurality of keywords from the extracted at least one text;
    generating, by the electronic device, at least one keyphrase of a plurality of keyphrases for the extracted at least one keyword; and
    merging, by the electronic device, at least one of the at least one keyword and the at least one keyphrase to generate the plurality of elements from the media, wherein the plurality of elements includes context dependent set of at least one of the plurality of keywords and the plurality of keyphrases, wherein merging the at least one of the at least one keyword and the at least one keyphrase includes:
        forming at least one list of keywords and keyphrases based on at least one source method associated with the at least one of the at least one keyword and the at least one keyphrase;
        assigning at least one rank along with timestamps to the at least one of the at least one keyword and the at least one keyphrase present in the at least one list of keywords and keyphrases;
        annotating the at least one list of keywords and keyphrases with the at least one source method associated with the at least one of the at least one keyword and the at least one keyphrase present in the at least one list of keywords and keyphrases;
        forming an intersection set and a union set by selecting the at least one list of keywords and keyphrases; and
        combining the intersection set and the union set to generate the context dependent set of elements from the media, wherein combining the intersection set and the union set includes:
            preserving the at least one rank of the at least one of the at least one keyword and the at least one keyphrase present in the intersection set that is higher than the union set;
            modifying the at least one rank of the at least one of the at least one keyword and the at least one keyphrase present in the intersection set by weighing the at least one rank of the at least one keyword and the at least one keyphrase with associated confidence score; and
            removing at least one of at least one duplicate keyword and at least one duplicate keyphrase present across the intersection set and the union set from the union set by listing frequencies and positions of occurrences of the at least one of the at least one keyboard and the at least one keyphrase.

2. The method of claim 1, wherein analyzing the at least one audio portion of the media includes:
    extracting the at least one audio portion from the media;
    separating at least one speech portion and at least one non-speech portion from the extracted at least one audio portion;
    applying at least one source method on the speech portion and the at least one non-speech portion to obtain the at least one text, wherein the at least one text obtained from the at least one audio portion includes at least one transcript and the at least one source method applied on the speech portion includes an Automatic Speech Recognition (ASR) method and the at least one source method applied on the at least one non-speech portion includes at least one of a Machine Learning (ML) method, an Artificial Intelligence (AI) method and Natural Language Processing (NLP) method.

3. The method of claim 1, wherein analyzing the at least one visual portion of the media includes:
    extracting the at least one visual portion from the media, wherein the visual portion includes at least one image frame and the at least one image frame includes at least one of at least one text portion and at least one object and action;
    obtaining the at least one text from the at least one image frame including the at least one text portion includes:
        applying the at least one source method on the at least one text portion of the at least one image frame, wherein the at least one source method includes an Optical Character Recognition (OCR) method; and
        extracting the at least one text from the at least one text portion of the at least one image frame by processing an output of the at least one source method, wherein the text extracted from the at least one text portion of the at least one image frame includes at least one of at least one fully formed sentence with identified nouns and adjectives and a set of sentences formed from at least one of a slide, a page a image, and a chapter of the media and an entire media;
    obtaining the at least one text from the at least one image frame including the at least one object and action includes:
        applying the at least one source method on the at least one image frame to detect the at least one object and action, wherein the at least one source method includes a Computer Vision (CV) method; and
        analyzing the detected at least one object and action to extract the at least one text, wherein the at least one text extracted from the at last one object and action includes at least one of keywords, a textual descriptor, a scene analysis text and an event analysis text.

4. The method of claim 1, wherein generating the at least one keyphrase for the at least one keyword includes:
   determining at least one another keyword that is in proximity with the extracted at least one keyword in the corresponding text obtained from the at least one source of the media; and
   generating the at least one keyphrase by associating the at least one extracted keyword with the determined at least one another keyword.

5. The method of claim 1, wherein forming the intersection set includes:
   combining the at least one of the at least one keyword and at least one keyphrase that is common in the selected at least one list of keywords and keyphrases to form the intersection set;
   adjusting the timestamps of the at least one of the at least one keyword and the at least one keyphrase present in the intersection list; and
   ranking the intersection set higher than the union set.

6. The method of claim 1, wherein forming the union set includes:
   combining the at least one of the at least one keyword and at least one keyphrase that is uncommon in the selected at least one list of keywords and keyphrases to form the union set; and
   removing at least one of at least one duplicate keyword and at least one duplicate keyphrase in the union set.

7. An electronic device comprising:
   a media analysis engine configured for:
      analyzing at least one source of the media to obtain at least one text, wherein the at least one source includes at least one of at least one audio portion and at least one visual portion; and
   a generation engine configured for:
      extracting at least one keyword of a plurality of keywords from the extracted at least one text;
      generating at least one keyphrase of a plurality of keyphrases for the extracted at least one keyword; and
      merging at least one of the at least one keyword and the at least one keyphrase to generate a plurality of elements from the media, wherein the plurality of elements includes context dependent set of at least one of the plurality of keywords and the plurality of keyphrases, wherein the generation engine is further configured for:
         forming at least one list of keywords and keyphrases based on at least one source method associated with the at least one of the at least one keyword and the at least one keyphrase;
         assigning at least one rank along with timestamps to the at least one of the at least one keyword and the at least one keyphrase present in the at least one list of keywords and keyphrases;
         annotating the at least one list of keywords and keyphrases with the at least one source method associated with the at least one of the at least one keyword and the at least one keyphrase present in the at least one list of keywords and keyphrases;
         forming an intersection set and a union set by selecting the at least one list of keywords and keyphrases; and
         combining the intersection set and the union set to generate the context dependent set of elements from the media, wherein the generation engine is further configured for:
            preserving the at least one rank of the at least one of the at least one keyword and the at least one keyphrase present in the intersection set that is higher than the union set;
            modifying the at least one rank of the at least one of the at least one keyword and the at least one keyphrase present in the intersection set by weighing the at least one rank of the at least one keyword and the at least one keyphrase with associated confidence score; and
            removing at least one of at least one duplicate keyword and at least one duplicate keyphrase present across the intersection set and the union set from the union set by listing frequencies and positions of occurrences of the at least one of the at least one keyboard and the at least one keyphrase.

8. The electronic device of claim 7, wherein the generation engine is further configured for:
   extracting the at least one audio portion from the media;
   separating at least one speech portion and at least one non-speech portion from the extracted at least one audio portion;
   applying at least one source method on the speech portion and the at least one non-speech portion to obtain the at least one text, wherein the at least one text obtained from the at least one audio portion includes at least one transcript and the at least one source method applied on the speech portion includes an Automatic Speech Recognition (ASR) method and the at least one source method applied on the at least one non-speech portion includes at least one of a Machine Learning (ML) method, an Artificial Intelligence (AI) method and Natural Language Processing (NLP) method.

9. The electronic device of claim 7, wherein the generation engine is further configured for:
   extracting the at least one visual portion from the media, wherein the visual portion includes at least one image frame and the at least one image frame includes at least one of at least one text portion and at least one object and action;
   obtaining the at least one text from the at least one image frame including the at least one text portion includes:
      applying the at least one source method on the at least one text portion of the at least one image frame, wherein the at least one source method includes an Optical Character Recognition (OCR) method; and
      extracting the at least one text from the at least one text portion of the at least one image frame by processing an output of the at least one source method, wherein the text extracted from the at least one text portion of the at least one image frame includes at least one of at least one fully formed sentence with identified nouns and adjectives and a set of sentences formed from at least one of a slide, a page a image, and a chapter of the media and an entire media;
   obtaining the at least one text from the at least one image frame including the at least one object and action includes:
      applying the at least one source method on the at least one image frame to detect the at least one object and action, wherein the at least one source method includes a Computer Vision (CV) method; and analyzing the detected at least one object and action to extract the at least one text, wherein the at least one text extracted from the at last one object and action includes at least one of keywords, a textual descriptor, a scene analysis text and an event analysis text.

10. The electronic device of claim 7, wherein the generation engine is further configured for:
determining at least one another keyword that is in proximity with the extracted at least one keyword in the corresponding text obtained from the at least one source of the media; and
generating the at least one keyphrase by associating the at least one extracted keyword with the determined at least one another keyword.

11. The electronic device of claim 7, wherein the generation engine is further configured for:
combining the at least one of the at least one keyword and at least one keyphrase that is common in the selected at least one list of keywords and keyphrases to form the intersection set;
adjusting the timestamps of the at least one of the at least one keyword and the at least one keyphrase present in the intersection list; and
ranking the intersection set higher than the union set.

12. The electronic device of claim 7, wherein the generation engine is further configured for:
combining the at least one of the at least one keyword and at least one keyphrase that is uncommon in the selected at least one list of keywords and keyphrases to form the union set; and
removing at least one of at least one duplicate keyword and at least one duplicate keyphrase in the union set.

\* \* \* \* \*